Figure 1:
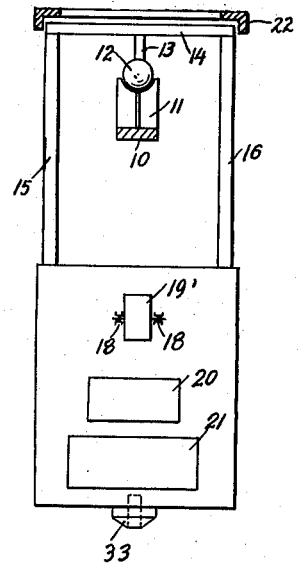

March 23, 1965   J. HINTZE ETAL   3,174,346
GYROSCOPIC INSTRUMENT
Filed Sept. 25, 1961

Inventors
Johannes Hintze
Hans Ehrich

:::

United States Patent Office 3,174,346
Patented Mar. 23, 1965

3,174,346
GYROSCOPIC INSTRUMENT
Johannes Hintze, Kiel, and Hans Ehrich, Schulensee, near Kiel, Germany, assignors to Anschutz & Co., G.m.b.H., Kiel-Wik, Germany, a limited-liability company of Germany
Filed Sept. 25, 1961, Ser. No. 140,454
Claims priority, application Germany, Sept. 30, 1960, A 35,704
5 Claims. (Cl. 74—5.7)

Our invention relates to a gyroscopic instrument of the type in which a rotor support carrying the gyroscope rotor is mounted in a frame for universal movement, the gyroscope rotor including electrical driving means which, when energized, preferably by alternating current, cause the rotor to spin, the means for mounting the support on the frame for universal movement being so designed as to involve a minimum of friction.

In conventional instruments of this type the electrical energy is supplied to the gyroscope rotor from a source of current disposed outside of the instrument. Therefore, the current conducting means connecting such source with the electrical driving means must be so chosen as to involve a minimum of friction interfering with said universal movement of the rotor support relative to the frame. Where such current-conducting means include slip rings and brushes or co-axially disposed pointed pins cooperating with contact springs, the friction interfering with the universal movement of the rotor support is quite substantial. Where the rotor support is constructed as a float and said current-conducting means include opposed pairs of electrodes conducting the electrical energy through the liquid in which the rotor support floats, the objectionable friction is eliminated; but this design is complicated and expensive and requires careful maintenance.

Therefore, it is the object of our invention to provide a gyroscopic instrument of the type indicated hereinabove which is simple in design and yet is free from any current-conducting means which would produce friction interfering with the universal movement of the rotor support.

We attain this object by mounting an electrical battery constituting the source of current, on the rotor support, thus rendering the instrument independent of any outside source of current and eliminating the necessity of providing any current-conducting means operative during the measuring operation carried out by the instrument to supply the current from the outside via the rotor support to the electrical driving means of the rotor.

It is a further object of our invention to provide simple and effective means for charging the battery during the times when the gyroscopic instrument is out of use and the rotor support is arrested within the frame of the instrument to prevent undesirable uncontrolled movements thereof during transport.

Our invention is of particular utility when applied to a gyroscopic compass serving geodetic purposes because in such instrument the rotor support is usually equipped with a weight causing its center of gravity to be located below its center of suspension. We prefer to form this weight entirely or in part by the battery.

Further objects of our invention will appear from a detailed description of a preferred embodiment of our invention with reference to the accompanying drawings following hereinafter. It is to be understood, however, that our invention is in no way restricted or limited to the details of such embodiment but is capable of numerous modifications within the scope of the appended claims and that the terms and phrases used in such detailed description have been chosen for the purpose of explaining the invention rather than that of restricting or limiting the same.

With the aforesaid objects in view, the invention consists in the novel combination and arrangements of parts hereinafter described and pointed out in the subjoined claims.

Figure 2:
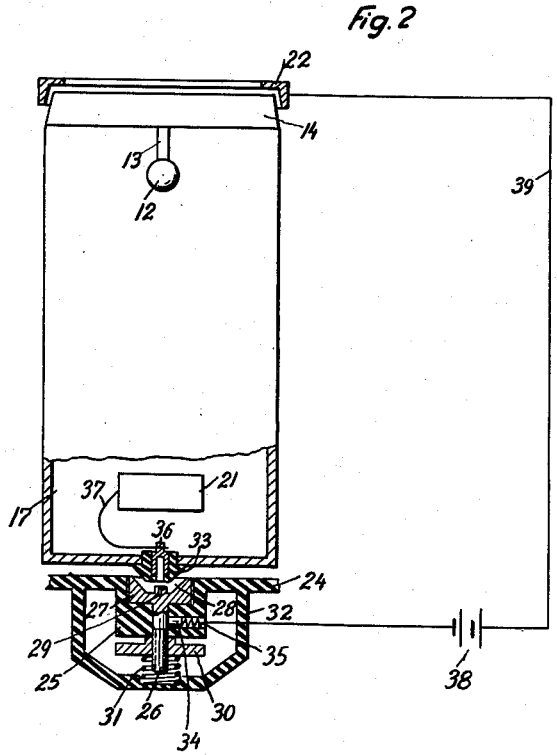

In the drawing
FIG. 1 is a diagrammatic side view of gyroscopic instrument constituting a geodetic compass, partly in section, and FIG. 2 is a vertical section taken through the lower portion of the rotor support and through arresting means mounted on the frame for arresting the rotor support.

The gyroscopic instrument shown in FIG. 1 constitutes a compass which serves geodetic purposes and is mounted on a stationary base. Its frame includes a horizontal bar 10. A concave spherical bearing member 11 fixed thereto is adapted to support a bearing member 12 which has a convex spherical surface. The member 11 has a centrally disposed orifice to which a gaseous or liquid lubricating medium may be supplied under pressure through a suitable duct. This medium will form an antifriction supporting film between the concave bearing surface of member 11 and the convex spherical surface of member 12 to thereby ensure a substantially frictionless mounting of the member 12 on the frame of the instrument. This member 12 forms part of a rotor support comprising a stem 13 fixed to the spherical member 12, a transverse beam fixed to the stem 13, a pair of columns 15 and 16 fixed to the ends of the transverse beam 14 and a housing 17 fixed to the lower ends of the columns 15 and 16. Hence, it will appear, that the members 11 and 12 constitute means for mounting the rotor support 13–17 on the frame of the instrument including bar 10 for frictionless universal movement.

A gyroscope rotor is mounted for rotation on the gyroscope support. For this purpose bearings 18 disposed coaxially to a horizontal axis are mounted in the housing 17 in fixed relationship thereto. The gyroscope rotor 19 which includes electrical driving means diagrammatically indicated at 19' is so mounted in the bearings 18 that it will spin about its horizontal axis, when the driving means 19' are energized by an alternating current.

Preferably, the rotor 19 forms the rotor of an asynchronous motor including field windings to which a plural-phase alternating current is supplied by a converter 20 which converts direct current supplied by a battery 21 into the alternating currents supplied to the electrical driving means 19'.

The converter 20 which may be a transistor generator and the battery 21 are mounted within and carried by the housing 17. As a result, the combined center of gravity of the rotor support and the elements carried thereby is disposed far below the center of suspension formed by the center of the spherical member 12 thus reducing the period of oscillation of the gyroscopic compass to a comparatively short period of time.

Preferably, the rotor support 13–17 is provided with suitable means for dampening the oscillations. The result of the measurement will be read after the oscillations have ceased. It is possible, however, to omit dampening means so that the rotor support will perform unmitigated oscillations and to determine the reversal points of the oscillation in the conventional manner by visual or automatic detection for the purpose of finding the result of the measurement by computation.

In any event, the measuring operation requires a comparatively brief time not exceeding about 10 minutes. Therefore, we prefer to so dimension the battery 21 that its capacity will be sufficient to accelerate the rotor 19 from its condition of rest to its full speed of operation and to thereafter maintain this speed for the period of the measuring operation.

After the measuring operation has been completed, the rotor support 13–17 must be arrested in order to prevent uncontrolled movement thereof during transportation. For this purpose, we prefer to clamp the rotor support to the frame of the instrument and to provide the frame with an annular member 22 disposed above the transverse beam 14 and with a member 24 disposed below the rotor support.

The arresting means is mounted on the member 24 below the rotor support and is movable between a lower inoperative position out of engagement with the rotor support and an upper arresting position in which the rotor support 13–17 is engaged and lifted by the arresting means and is pressed against the frame member 22 for being immobilized relative thereto.

In the embodiment shown, the member 24 extends horizontally below the housing 17 and has a boss 25 substantially co-axially disposed thereto and provided with an axial vertical bore in which a stem 26 is slidably mounted. This stem 26 has a substantially cylindrical head 27 consisting of an electrically conductive material. The top of this head 27 is provided with a conical recess 28 and with a plug member 29 disposed centrally within such recess. The lower end section of stem 26 is threaded and carries a nut 30 resting on a helical pressure spring 31. This spring in its turn rests on a yoke 32 fixed to or integral with the member 24.

The bottom of the housing 17 carries a substantially frusto-conical member 33 projecting downwardly to such an extent as to be normally spaced from the head 27. When the nut 30 is turned, however, so as to be screwed downwardly relatively to the stem 26, this stem will be raised while the nut 30 is held by the spring 31 in engagement with the bottom face of boss 25. As a result, the head 27 will be lifted and will engage the projection 33 to thereby center and arrest the rotor support 13–17 pressing the latter against the annular frame member 22.

The arresting means just described include current-conducting means which are connected to a source of charging current and are arranged for contacting electrical contact means mounted on the rotor support, when the arresting means formed by the head 27 is in its upper position.

For this purpose the boss 25 is provided with a horizontal bore accommodating a contact shoe 34 slidably guided therein and a helical pressure spring 35 which urges the shoe 34 inwardly into contact with the stem 26. The electrical contact means mounted on the rotor support comprise a socket member 36 formed of electrically conductive material and inserted in an axial bore of the member 33 which consists of a suitable insulating material. This socket member is connected by suitable means including a lead 37 to the battery 21. The boss 25 consists of a suitable insulating material. The source of charging current is diagrammatically represented as a battery 38 having one terminal connected to the contact shoe 34 and the other terminal to the frame member 22.

The helical spring 31 prevents undue pressure from being exerted by the nut 30 upon the rotor support as this spring will yield permitting the nut 30 to recede from the boss 25, when the rotary operation of the nut 30 is continued after head 27 has lifted the rotor support into engagement with the frame member 22. As a result of this engagement the plug 29 will enter the socket member 36 and will thereby close a circuit extending from one terminal of the source of current 38 through the shoe 34, the stem 26, the head 27, the plug 29, the socket 36, the lead 37, the battery 21, and through such conductive elements of the instrument as will complete the circuit through housing 17, columns 15, 16, beam 14, stem 13, ball 12, frame bar 10, frame member 22 and lead 39.

Preferably, the rotor support is kept in arrested condition, while the gyroscope rotor is being accelerated preparatory to a measuring operation. Only after the rotor will have attained its full speed, will the nut 30 be operated to free the rotor support and to interrupt the battery-charging circuit. In this manner, the considerable energy required to accelerate the gyroscope rotor will be supplied by the outside source of current 38 and will not weaken the battery 21. Therefore, the battery 21 needs to supply the comparatively low energy only which is required during the measuring operation to maintain the speed of rotation of the rotor 19 constant at a rate sufficient for the measuring operation.

The advantages of the invention as here outlined are best realized when all of its features and instrumentalities are combined in one and the same structure, but useful devices may be produced embodying less than the whole.

Thus, we may omit the battery 21 altogether, thus supplying direct current to the converter 20 in the arrested condition of the rotor support only preparatory to the measuring operation. As a result, no driving torque will be exerted upon the rotor anymore after the outside source 38 of current will have been cut off, when the arresting means 27 are lowered into inoperative position. Consequently, the speed of rotation of the gyroscope rotor 19 will drop somewhat during the measuring operation requiring a time in the order of 10 minutes. While such drop of rotary speed will adversely affect the measuring accuracy of the instrument, the measuring results may still be satisfactory for many purposes.

It will be obvious to those skilled in the art to which the invention appertains that the same may be incorporated in several different constructions. The accompanying drawing, therefore, is submitted merely as showing the preferred exemplification of the invention.

From the foregoing it will be seen that this invention is one well adapted to attain all of the ends and objects hereinabove set forth, together with other advantages which are obvious and which are inherent to the instrument.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. A gyroscopic instrument comprising a frame, a rotor support, means for mounting said support on said frame for universal movement, a gyroscope rotor mounted for rotation on said support and including electrical driving means for rotating said rotor, and an electrical battery mounted on said support and electrically connected with said driving means for supplying electrical energy thereto.

2. A gyroscopic instrument as claimed in claim 1 further comprising a converter connected to said battery for converting the direct current supplied thereby into alternating current for the operation of said electrical driving means.

3. A gyroscopic instrument as claimed in claim 1 further comprising arresting means mounted on said frame and movable into engagement with said rotor support for immobilizing the latter relative to said frame, and electrical contact means mounted on said rotor support and electrically connected to said battery for supplying charging current thereto, said arresting means including current conducting means connected to a source of charging current and arranged for contacting said contact means, when said arresting means is moved into said engagement.

4. A gyroscopic instrument comprising a frame, a rotor support, means on said frame carrying said rotor support for universal movement, a gyroscope rotor mounted for rotation on said support and including electrical driving means for rotating said rotor, an electrical battery mounted on said support and electrically connected with said driving means for supplying electrical energy thereto, arresting means mounted on said frame below said rotor support and movable between a lower inoperative position out of engagement with said rotor support and an upper arresting position in which said rotor support is engaged and lifted by said arresting means and pressed against said frame for being immobilized relative thereto, and electrical contact means mounted on said rotor support and electrically connected to said battery for supplying charging current thereto, said arresting means including current conducting means connected to a source of charging current and arranged for contacting said contact means, when said arresting means is moved into said upper arresting position, and for disengaging said contact means, when said arresting means is moved into said lower inoperative position.

5. A gyroscopic instrument comprising a frame, a rotor support, means on said frame carrying said rotor support for universal movement, a gyroscope rotor mounted for rotation on said support and including electrical driving means for rotating said rotor, arresting means mounted on said frame below said rotor support and movable between a lower inoperative position out of engagement with said rotor support and an upper arresting position in which said rotor support is engaged and lifted by said arresting means and pressed against said frame for being immobilized relative thereto, and electrical contact means mounted on said rotor support and electrically connected to said driving means for supplying current thereto, said arresting means including current-conducting means connected to a source of current and arranged for contacting said contact means, when said arresting means is moved into said upper arresting position, and for disengaging said contact means, when said arresting means is moved into said lower inoperative position.

References Cited by the Examiner
UNITED STATES PATENTS
2,732,721   1/56   Summers.

BROUGHTON G. DURHAM, *Primary Examiner.*